(12) United States Patent
Heuer et al.

(10) Patent No.: US 8,031,647 B2
(45) Date of Patent: *Oct. 4, 2011

(54) MULTIPLEXING APPARATUS IN A TRANSCEIVER SYSTEM

(75) Inventors: William C. Heuer, St. Louis Park, MN (US); Yoshi Kasahara, Chaska, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/707,921

(22) Filed: Feb. 18, 2010

(65) Prior Publication Data

US 2010/0142420 A1    Jun. 10, 2010

Related U.S. Application Data

(63) Continuation of application No. 11/943,724, filed on Nov. 21, 2007, now Pat. No. 7,701,887.

(51) Int. Cl.
*H04B 7/00* (2006.01)

(52) U.S. Cl. ..................................... 370/310

(58) Field of Classification Search .......... 370/276–278, 370/297, 310, 328, 339; 455/524, 525, 561, 455/562
See application file for complete search history.

(56) References Cited

U.S. PATENT DOCUMENTS

| | | | |
|---|---|---|---|
| 5,502,715 A | 3/1996 | Penny | |
| 5,969,837 A | 10/1999 | Farber et al. | |
| 6,269,255 B1 | 7/2001 | Waylett | |
| 6,640,111 B1 | 10/2003 | Shapira | |
| 6,658,263 B1 | 12/2003 | Ke et al. | |
| 6,823,003 B2 | 11/2004 | Laureanti | |
| 6,892,056 B1 | 5/2005 | Garmonov et al. | |
| 6,957,047 B1 | 10/2005 | Young et al. | |
| 7,120,465 B2 | 10/2006 | Skarby et al. | |
| 7,123,939 B1 | 10/2006 | Bird et al. | |
| 7,532,861 B2 | 5/2009 | Ranta et al. | |
| 2010/0144289 A1* | 6/2010 | Haskell et al. | 455/83 |

FOREIGN PATENT DOCUMENTS

KR    1020020011638    2/2002
KR    1020060101052    9/2006

* cited by examiner

*Primary Examiner* — Dmitry H Levitan
(74) *Attorney, Agent, or Firm* — Fogg & Powers LLC

(57) ABSTRACT

A system for transceiving radio frequency signals is provided. The system includes a multiplexing apparatus at a base of a tower and communicatively coupled to a cable, and a low noise amplifier at the base of the tower. The multiplexing apparatus includes a transmitter path, a portion of a receiver path, and a transceiver path portion. The low noise amplifier is operable to amplify signals in a first spectral region and is communicatively coupled to the multiplexing apparatus. The multiplexing apparatus is configured to pass signals in the first spectral region between the cable and a first-band base transceiver station via the low noise amplifier. The multiplexing apparatus is further configured to pass signals in a second spectral region between the cable and at least one second-band base transceiver station.

20 Claims, 9 Drawing Sheets

MULTIPLEXING APPARATUS IN A TRANSCEIVER SYSTEM

This application is a continuation of U.S. application Ser. No. 11/943,724, filed on Nov. 21, 2007, and entitled "MULTIPLEXING APPARATUS IN A TRANSCEIVER SYSTEM," which is incorporated herein by reference in its entirety.

BACKGROUND

It is desirable for telecom carriers to minimize the number of radio frequency cables used to communicatively couple base stations to the antennae located atop a cell tower. The radio frequency cables, which typically extend from the bottom to the top of the cell tower, are expensive, costly to install, and increase wind-loading on a tower. As the number of radio frequency cables in a cell tower increases, the cost of installing and maintaining cell tower increases.

FIG. 2 is a block diagram of a prior art embodiment of a multiplexer 29. As shown in FIG. 2, the current technology to reduce the number of radio frequency cables to one cable 155 used to communicatively couple base stations 28(1-N) to the antennae (not shown) located atop a cell tower (not shown) comprises band pass filters 111(1-N).

SUMMARY

The present application relates to a system for transceiving radio frequency signals. The system includes a multiplexing apparatus at a base of a tower and communicatively coupled to a cable, and a low noise amplifier at the base of the tower. The multiplexing apparatus includes a transmitter path, a portion of a receiver path, and a transceiver path portion. The low noise amplifier is operable to amplify signals in a first spectral region and is communicatively coupled to the multiplexing apparatus. The multiplexing apparatus is configured to pass signals in the first spectral region between the cable and a first-band base transceiver station via the low noise amplifier. The multiplexing apparatus is further configured to pass signals in a second spectral region between the cable and at least one second-band base transceiver station.

DRAWINGS

Figure 9:
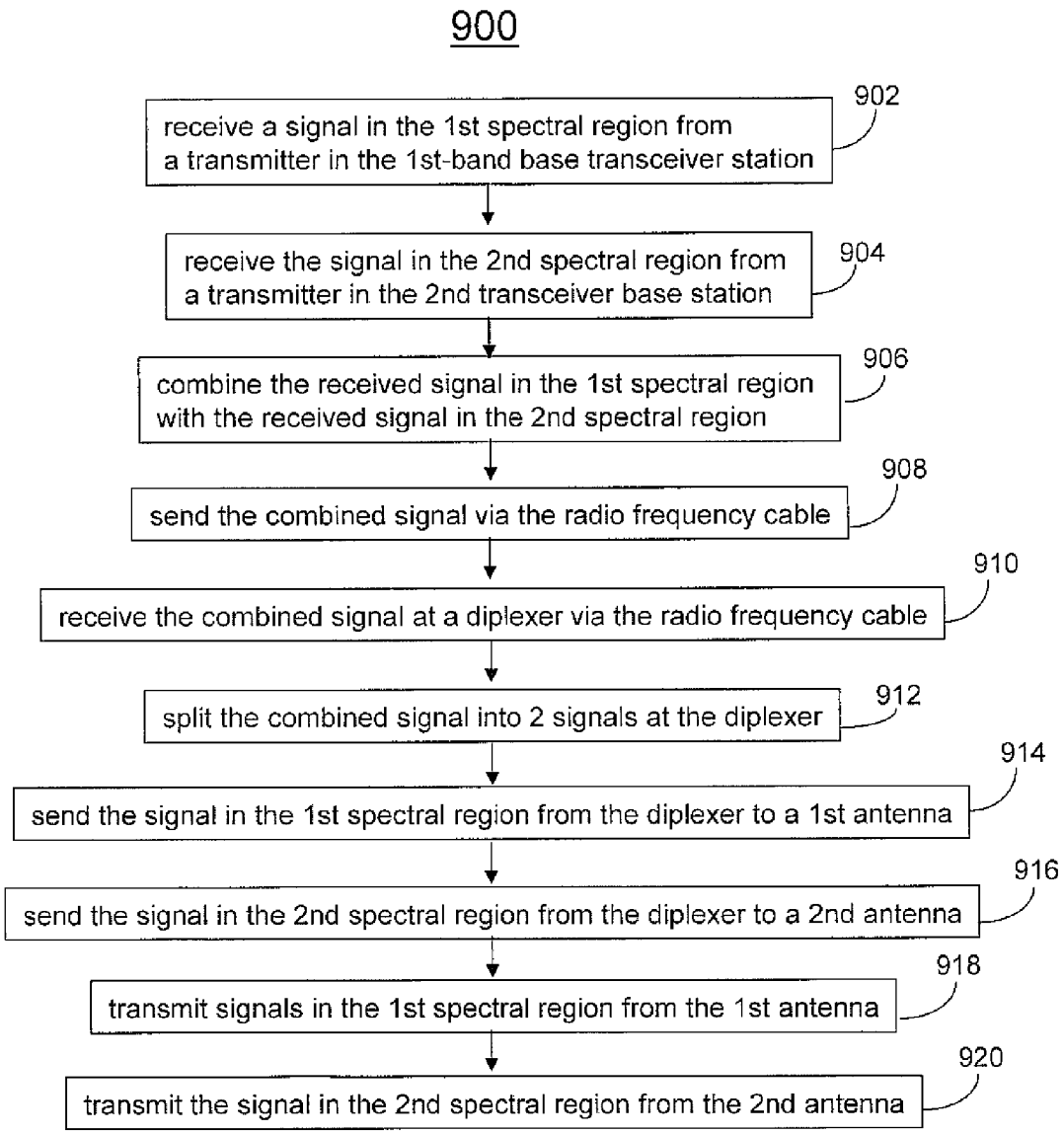

FIG. 9 is a flow diagram of one embodiment of a method of receiving signals in two radio frequency spectral regions in a diplexing apparatus and transmitting the signals from the diplexing apparatus to antennae for transmission In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
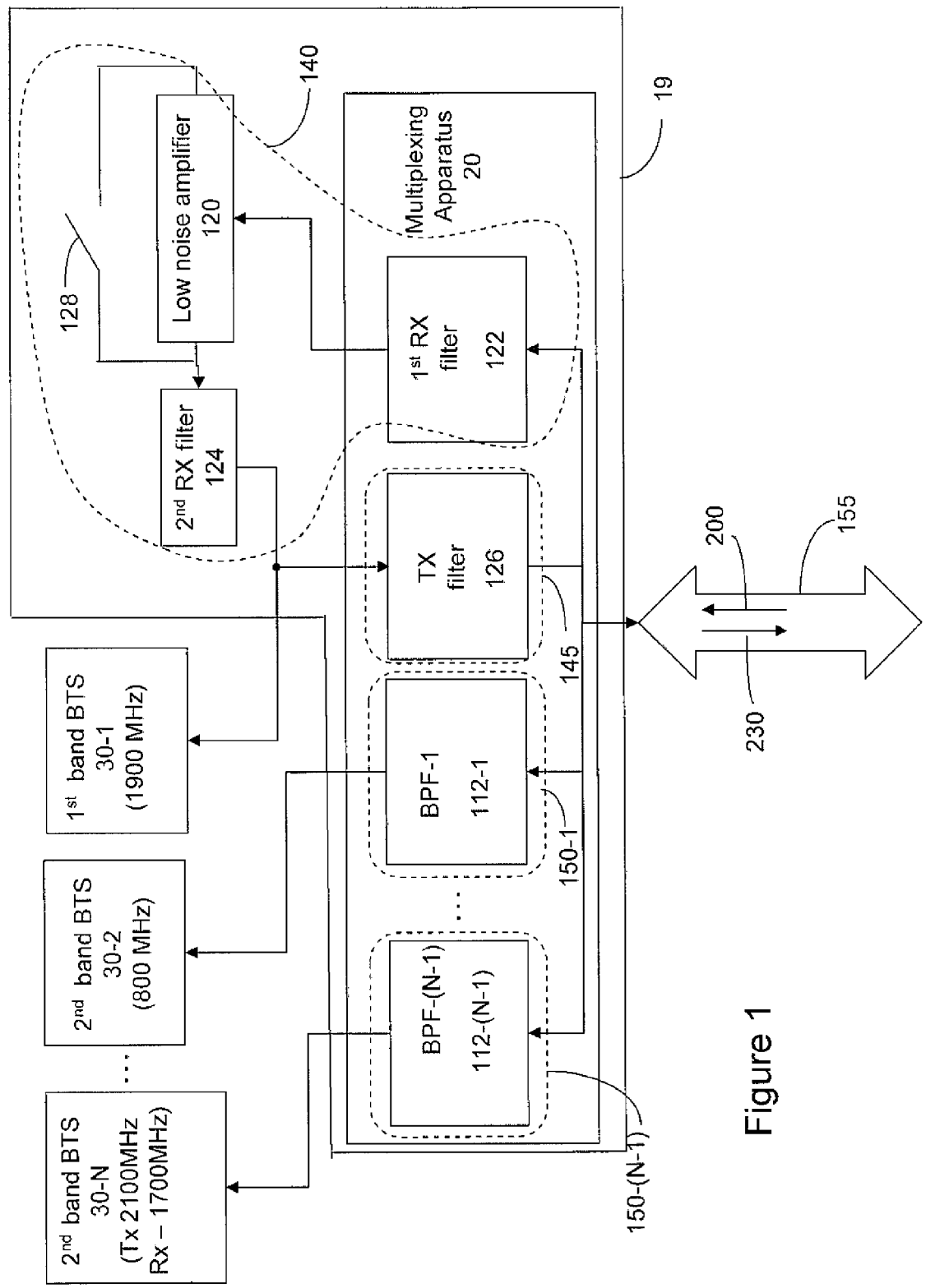
FIG. 1 is a block diagram of one embodiment of a multiplexing apparatus in accordance with the present invention.
Figure 2:
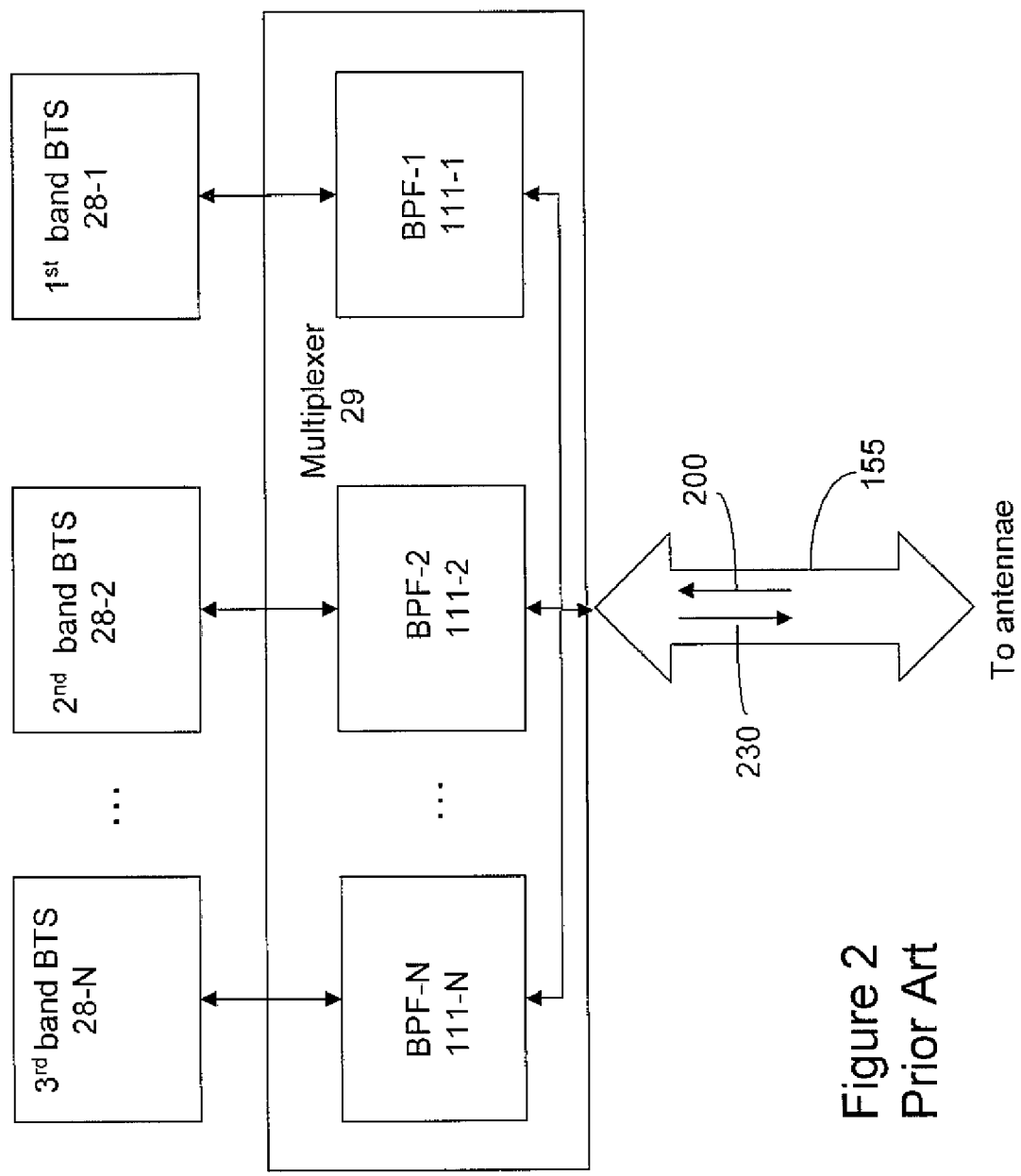
FIG. 2 is a block diagram of a prior art embodiment of a multiplexer.

FIG. 1 is a block diagram of one embodiment of a multiplexing apparatus 20 in accordance with the present invention. The multiplexing apparatus 20 includes at least one band pass filter 112(1-(N−1)), a receiver filter 122, and a transmitter filter 126. The multiplexing apparatus 20 is communicatively coupled with a plurality of base transceiver stations 30(1-N). A radio frequency cable 155 (also referred to herein as cable 155) is communicatively coupled to the multiplexing apparatus 20. Specifically, the receiver filter 122 (also referred to herein as "first receiver filter 122"), the transmitter filter 126, and each band pass filter 112-i are communicatively coupled to the cable 155. The radio frequency cable 155 carries radio frequency signals represented generally by the arrow 200 from antennae (not shown in FIG. 1) to the multiplexing apparatus 20. The radio frequency cable 155 carries radio frequency signals represented generally by the arrow 230 to the antennae from the multiplexing apparatus 20.

The first receiver filter 122 is communicatively coupled to a low noise amplifier 120. The low noise amplifier 120 is operably positioned between the first receiver filter 122 and a second receiver filter 124. The second receiver filter 124 is communicatively coupled to a first-band base transceiver station 30-1. As defined herein, a first-band base transceiver station transceives signals in a first spectral band or region.

Figure 3:
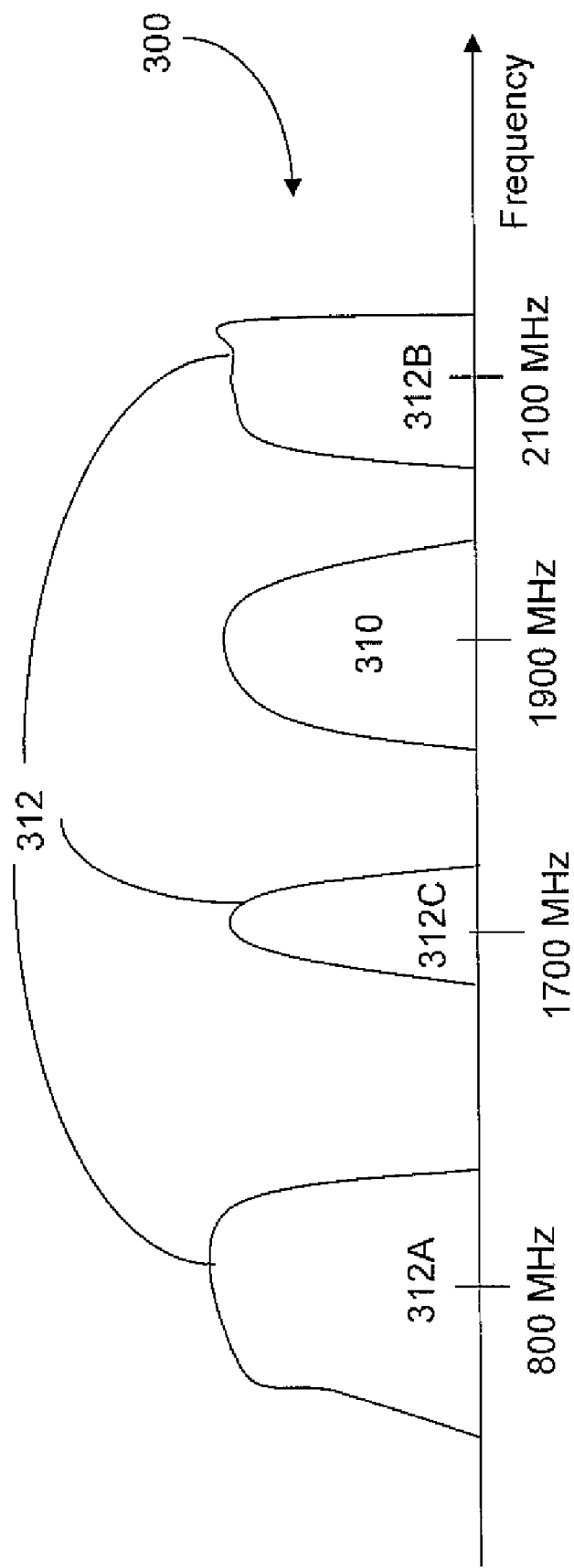
FIG. 3 is a block diagram of one embodiment of spectral regions in accordance with the present invention.

The multiplexing apparatus 20 combines signals in a plurality of spectral regions, such as a first spectral region and a second spectral region. FIG. 3 is a block diagram of one embodiment of spectral regions 300 in accordance with the present invention. The spectral regions 300 include first spectral region 310 (also referred to herein as a "first spectral band 310") and second spectral region 312 (also referred to herein as a "second spectral band 312"). The second spectral region 312 includes portions such as first portion 312A, second portion 312B, and third portion 312C of second spectral region 312.

The first receiver filter 122, the low noise amplifier 120, and the second receiver filter 124 comprise a receiver path 140 between the cable 155 and the first-band base transceiver station 30-1. The first receiver filter 122, which is the portion of the receiver path 140 located in the multiplexing apparatus 20, passes signals in a first spectral region 310 from the cable 155 to the first-band base transceiver station 30-1 via the low noise amplifier 120 and the second receiver filter 124. The low noise amplifier 120 amplifies signals in the first spectral region 310.

The transmitter filter 126 passes signals in the first spectral region 310 from the first-band base transceiver station 30-1 to the cable 155. The transmitter filter 126 comprises a transmitter path 145 in the multiplexing apparatus 20 from the first-band base transceiver station 30-1 to the cable 155.

Each band pass filter 112(1-(N−1)) is communicatively coupled between the cable 155 and a respective one of the second-band base transceiver stations 30(2-N). As defined herein, a second-band base transceiver station transceives signals in the second spectral region 312. As shown in FIG. 1, (N−1) band pass filters 112(1-(N−1)) are communicatively coupled between the cable 155 and a plurality of second-band base transceiver stations 30(2-N). Each band pass filter 112-$i$ is a transceiver path 150-$i$. Each band pass filter 112-$i$ is a narrowband filter that filters and bi-directionally passes signals in respective portions (such as, portions 312A, 312B, and 312C) of the second spectral region 312 between the cable 155 and the respective second-band base transceiver station 30(2-N).

Thus, the multiplexing apparatus 20 includes the transmitter path 145, a portion of a receiver path 140, and at least one transceiver path 150-$i$. In this manner, the multiplexing apparatus 20 passes signals in the first spectral region 310 between the cable 155 and the first-band base transceiver station 30-1 via the low noise amplifier 120 and passes signals in the second spectral region 312 between the cable 155 and at least one second-band base transceiver station 30-2. In one implementation of this embodiment, at least one band pass filter 112-$i$ is an inline cavity filter. In another implementation of this embodiment, each band pass filter 112-$i$ is an inline cavity filter.

The links connecting the band pass filters 112(1-(N−1)), the first receiver filter 122 and the transmitter filter 126 to the cable 155 include one or more trace line, wires, solder, or connectors. Likewise, the links connecting the first receiver filter 122, the low noise amplifier 120, and the second receiver filter 124 include one or more trace line, wires, solder, or connectors. In one implementation of this embodiment, the transmitter filter 126, the first receiver filter 122, and the band pass filters 112(1-(N−1)) are integrated on a common circuit board. In another implementation of this embodiment, the transmitter filter 126, the first receiver filter 122, the band pass filters 112(1-(N−1)), the low noise amplifier 120, and the second receiver filter 124 are integrated on a common circuit board. As shown in FIG. 1, the multiplexing apparatus 20 is located within a housing 19 with the low noise amplifier 120 and the second receiver filter 124.

In one implementation of this embodiment, the low noise amplifier 120 is a ground mounted amplifier. In another implementation of this embodiment, the low noise amplifier 120 is in parallel to a switch 128. In the event that the low noise amplifier 120 fails, the switch 128 is closed and the signals are transmitted from the first receiver filter 122 to the second receiver filter 124 via the switch 128.

In one implementation of this embodiment, the first and second spectral regions 310 and 312 are in the radio frequency band as shown in FIG. 3. In another implementation of this embodiment, the first spectral region 310 is centered about the 1900 MHz frequency band. In another implementation of this embodiment, the first portion 312A of the second spectral region 312 is centered about the 800 MHz frequency band. In yet another implementation of this embodiment, the second portion 312B and third portion 312C of the second spectral region 312 are centered about the 1700 MHz and 2100 MHz frequency bands, respectively. This latter embodiment can be used in an Advance Wireless Services (AWS) system in which the signals are transmitted from the base transceiver station 30-$i$ in the 2100 MHz spectral region 312B and signals are received at the same base transceiver station 30-$i$ in the 1700 MHz spectral region 312C. In yet another implementation of this embodiment, the second spectral region 312 only includes the first portion 312A of the spectral region 312. In yet another implementation of this embodiment, the second spectral region 312 includes the second portion 312B and the third portion 312C of the spectral region 312.

Figure 4:
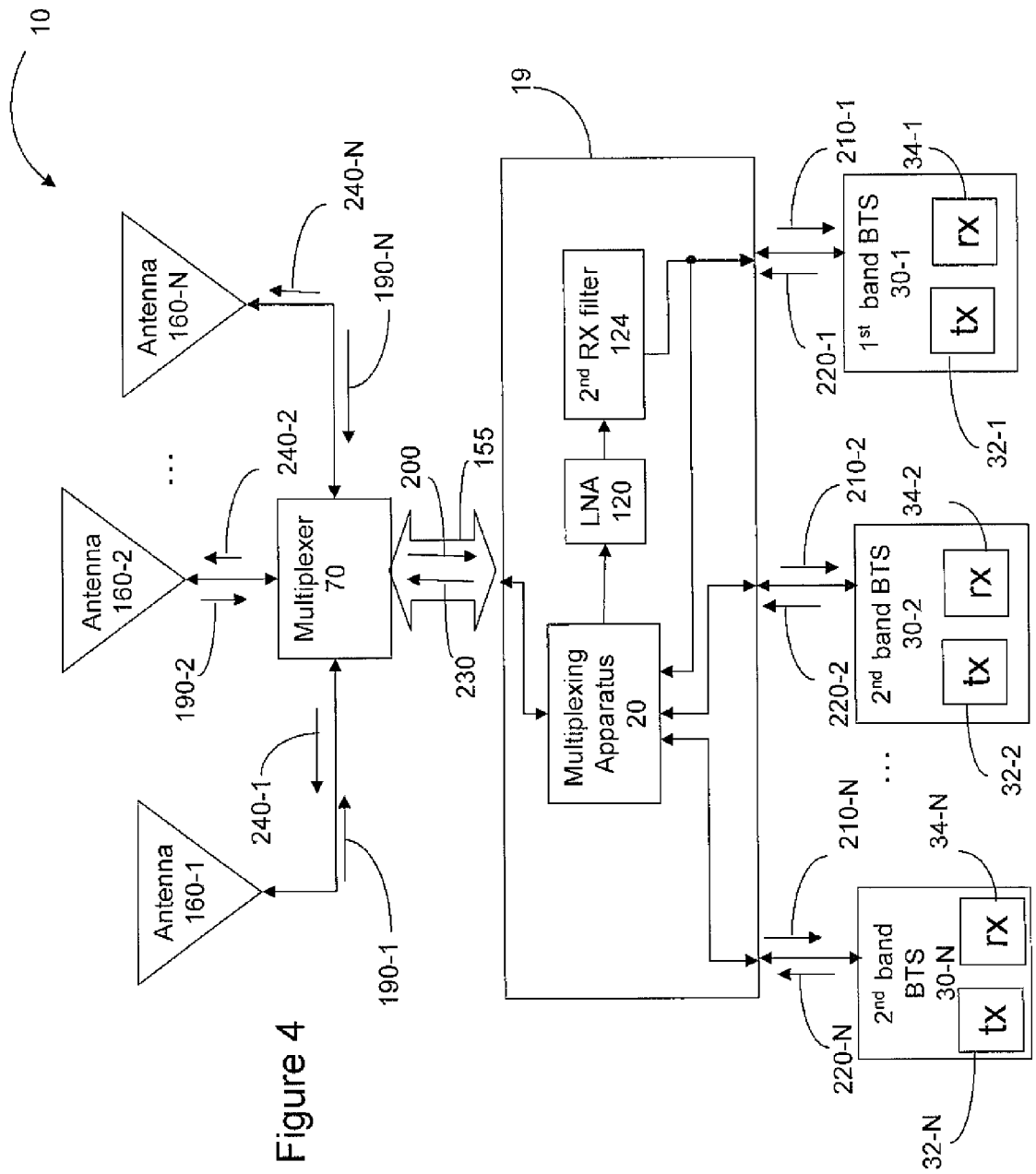
FIG. 4 is a block diagram of one embodiment of a multiplexing apparatus in a system for transceiving radio frequency signals in accordance with the present invention.

FIG. 4 is a block diagram of one embodiment of a multiplexing apparatus 20 in a system 10 for transceiving radio frequency signals in accordance with the present invention. As shown in FIG. 4, the radio frequency cable 155 communicatively couples the multiplexing apparatus 20 to a multiplexer 70. The multiplexer 70 is communicatively coupled to a first antenna 160-1 and at least two other antennae 160(2-N). The first antenna 160-1 receives and transmits signals in the first spectral region 310 and the at least two other antennae 160(2-N) receive and transmit signals in respective portions 312A, 312B, and/or 312C of the second spectral region 312 (FIG. 3). In the system 10, the multiplexing apparatus 20 is configured as shown in FIG. 1 to include at least two band pass filters 112(1-N).

Specifically, system 10 includes the multiplexing apparatus 20, which is communicatively coupled to the radio frequency cable 155, at least two base transceiver stations 30(1-2), and a low noise amplifier 120. In one implementation of this embodiment, system 10 includes multiplexing apparatus 20, the second receiver filter 124, and low noise amplifier 120. In another implementation of this embodiment, system 10 includes multiplexing apparatus 20, the second receiver filter 124, low noise amplifier 120, the cable 155, a multiplexer 70, and at least two antennae 160(1-2). In yet another implementation of this embodiment, system 10 includes multiplexing apparatus 20, the second receiver filter 124, low noise amplifier 120, the cable 155, a multiplexer 70, at least two antennae 160(1-2), and at least two base transceiver stations 30(1-2). Each base transceiver station 30-$i$ includes a respective transmitter 32-$i$ and a respective receiver 34-$i$. In yet another implementation of this embodiment, the transmitter 32-$i$ and receiver 34-$i$ in a base transceiver station 30-$i$ form a transceiver.

The radio frequency signals (also referred to herein as "signals") are represented generally by numerically labeled arrows. The radio frequency signals 190(1-N) are sent from the antennae 160(1-N) to the multiplexer 70. The multiplexer 70 combines the radio frequency signals 190(1-N) into a combined signal 200, which is sent to the multiplexing apparatus 20 via the cable 155. The combined signal 200 is received at the multiplexing apparatus 20 and is split into a plurality of signals within different frequency bands, which are each sent to a respective one of the base transceiver stations 30(1-N). For example, signal 210-1 is sent to the first-band base transceiver station 30-1, signal 210-2 is sent to the second-band base transceiver station 30-2, and signal 210-N is sent to another second-band base transceiver station 30-N.

The multiplexing apparatus 20 also receives radio frequency signals from the base transceiver stations 30(1-N). For example, signal 220-1 is sent to the multiplexing apparatus 20 from the first-band base transceiver station 30-1, signal 220-2 is sent to the multiplexing apparatus 20 from the second-band base transceiver station 30-2, and signal 220-N is sent to the multiplexing apparatus 20 from the other second-band base transceiver station 30-N. The signals 220(1-N) are combined in the multiplexing apparatus 20 and sent to the multiplexer 70 as combined signal 230 via radio frequency cable 155. The multiplexer 70 splits the combined signal 230 into signals 240(1-N), which are sent to the respective antennae 160(1-N).

The base transceiver stations 30(1-N) each transceive a different portion of the spectral region 300. If there are N base transceiver stations, then (N−1) base transceiver stations are second-band base transceiver stations. In this case, each of the second-band base transceiver stations (such as 30(2-N)), transceives signals in different portions (such as, 312A, 312B, and 312C) of the second spectral region 312. For example, as shown in FIG. 4, the first-band base transceiver station 30-1 transceives within the first spectral region 310 at about 1900 MHz, the second-band base transceiver station 30-2 transceives within a first portion 312A of the second spectral region 312 at about 800 MHz, while the third base transceiver station 30-3 transmits within a second portion 312B of the second spectral region 312 and receives within a third portion 312C of the second spectral region 312.

The first antenna 160-1 receives and transmits signals in the first spectral region 310. As shown in FIG. 4, at least two other antennae 160(2-N) are configured to receive and transmit signals in a respective portions 312A, 312B, and/or 312C of the second spectral region 312.

Figure 5:
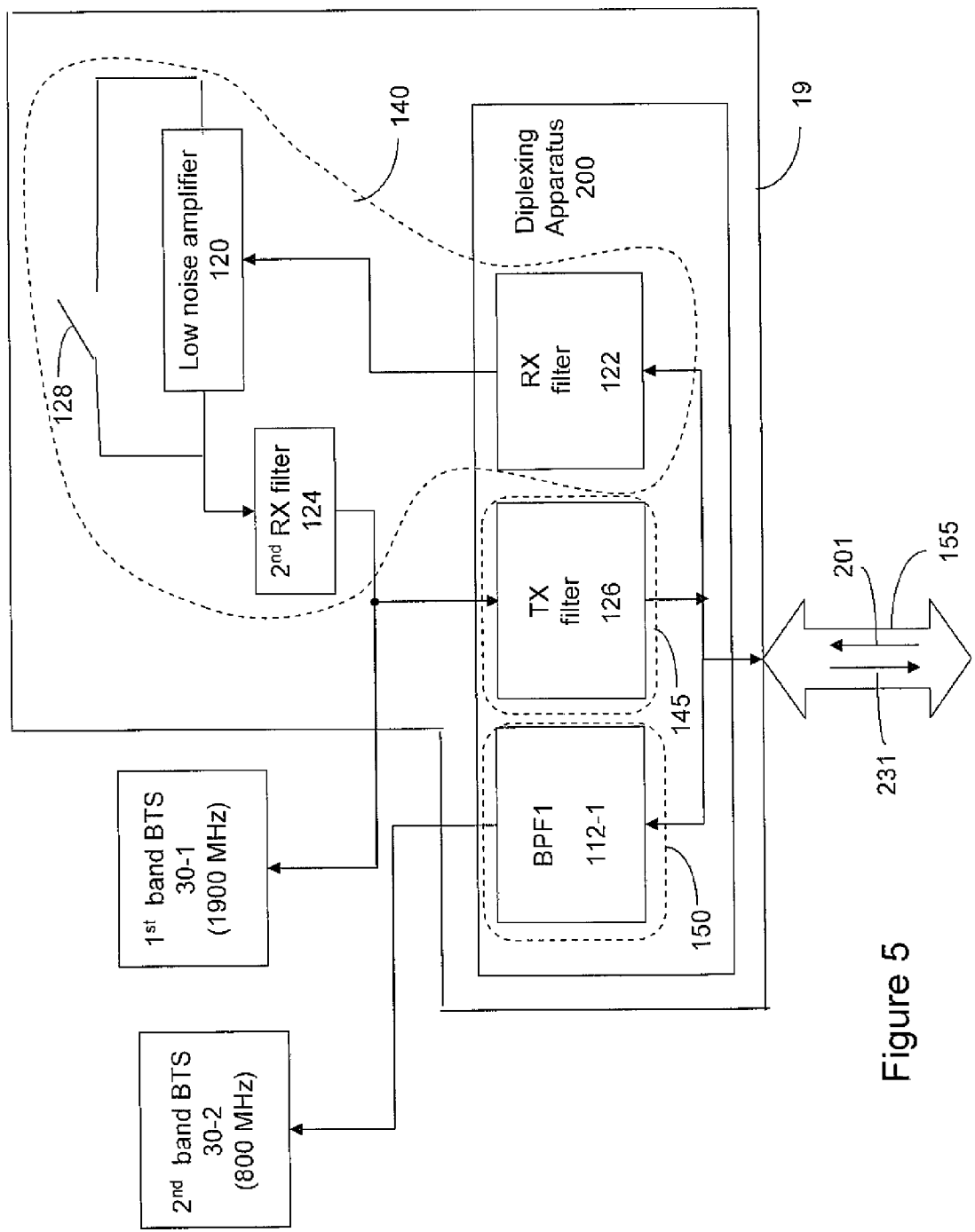
FIG. 5 is a block diagram of one embodiment of a diplexing apparatus in accordance with the present invention.

As shown in FIGS. 1 and 4, there are at least three base transceiver stations and at least two second-band base transceiver stations. When only one second-band base transceiver station, such as 30-2, is communicatively coupled to the multiplexing apparatus, the multiplexing apparatus is referred to as a diplexing apparatus. FIG. 5 is a block diagram of one embodiment of a diplexing apparatus 200 in accordance with the present invention. The diplexing apparatus 200 includes a single band pass filter 112-1, the transmitter filter 126, and the receiver filter 122. In this embodiment, the transmitter path 145 and the receiver path 140 are similar in structure and function to the transmitter path 145 and the receiver path 140 described above with reference to FIGS. 1 and 4. In this embodiment there is only one transceiver path 150 and only one second-band base transceiver station 30-2.

Figure 6:
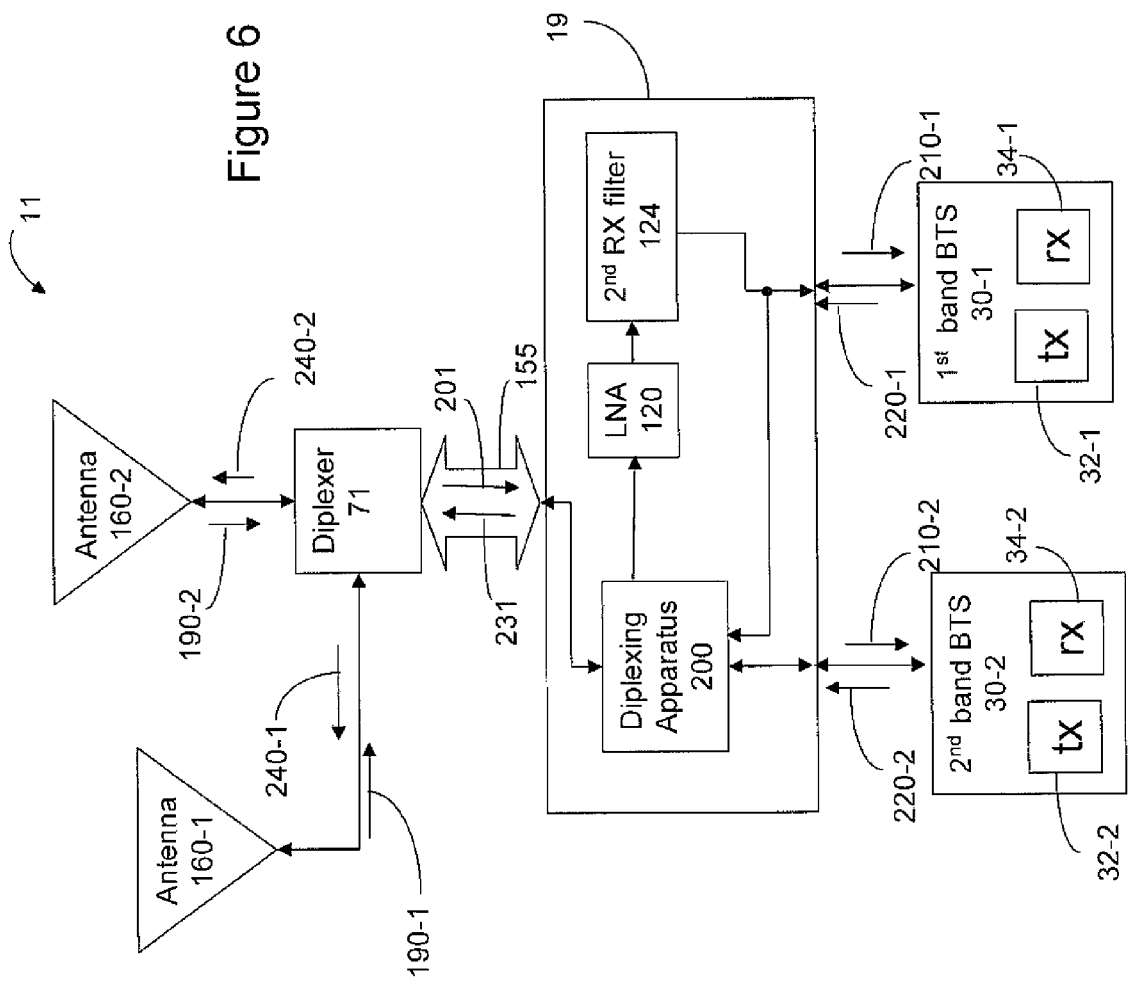
FIG. 6 is a block diagram of one embodiment of a diplexing apparatus in a radio frequency system in accordance with the present invention.

FIG. 6 is a block diagram of one embodiment of a diplexing apparatus 200 in a radio frequency system 11 in accordance with the present invention. As shown in FIG. 6, the radio frequency cable 155 is communicatively coupled the diplexing apparatus 200 to a diplexer 71 and the diplexer 71 is communicatively coupled to a first antenna 160-1 and a second antenna 160-2. The first antenna 160-1 receives and transmits signals in the first spectral region 310 and the second antenna 160-2 receives and transmits signals in a portion 312A, 312B, and/or 312C of the second spectral region 312 (FIG. 3). In the system 11, the diplexing apparatus 200 is configured as shown in FIG. 5 to include only one band pass filter 112-1.

Specifically, system 11 includes the diplexing apparatus 200, which is communicatively coupled to the radio frequency cable 155, a first-band base transceiver station 31-1, a second-band base transceiver station 30-2, and a low noise amplifier 120. In one implementation of this embodiment, system 11 includes the diplexing apparatus 200, the second receiver filter 124, and the low noise amplifier 120. In another implementation of this embodiment, system 11 includes the diplexing apparatus 200, the second receiver filter 124, the low noise amplifier 120, the cable 155, the diplexer 71, and two antennae 160(1-2). In yet another implementation of this embodiment, system 11 includes the diplexing apparatus 200, the second receiver filter 124, the low noise amplifier 120, the cable 155, the diplexer 71, two antennae 160(1-2), and base transceiver stations 30(1-2). The two base transceiver stations 30(1-2) have the function and structure described above with reference to FIG. 4. The two antennae 160(1-2) also have the function and structure described above with reference to FIG. 4.

The radio frequency signals 190(1-2) are sent from the antennae 160(1-2), respectively, to the diplexer 71. The diplexer 71 combines the radio frequency signals 190(1-2) into a combined signal 201, which is sent to the diplexing apparatus 200 via the cable 155. The combined signal 201 is received at the diplexing apparatus 200 and is split into two signals within two frequency bands. Signal 210-1 is sent to the first-band base transceiver station 30-1 and signal 210-2 is sent to the second-band base transceiver station 30-2.

The diplexing apparatus 200 also receives radio frequency signals from the base transceiver stations 30(1-2). For example, signal 220-1 is sent to the diplexing apparatus 200 from the first-band base transceiver station 30-1 and signal 220-2 is sent to the diplexing apparatus 200 from the second-band base transceiver station 30-2. The signals 220(1-2) are combined in the diplexing apparatus 200 and sent to the diplexer 71 as combined signal 231 via radio frequency cable 155. The diplexer 71 splits the combined signal 231 into signals 240(1-2) which are sent to the respective antennae 160(1-2).

Figure 7:
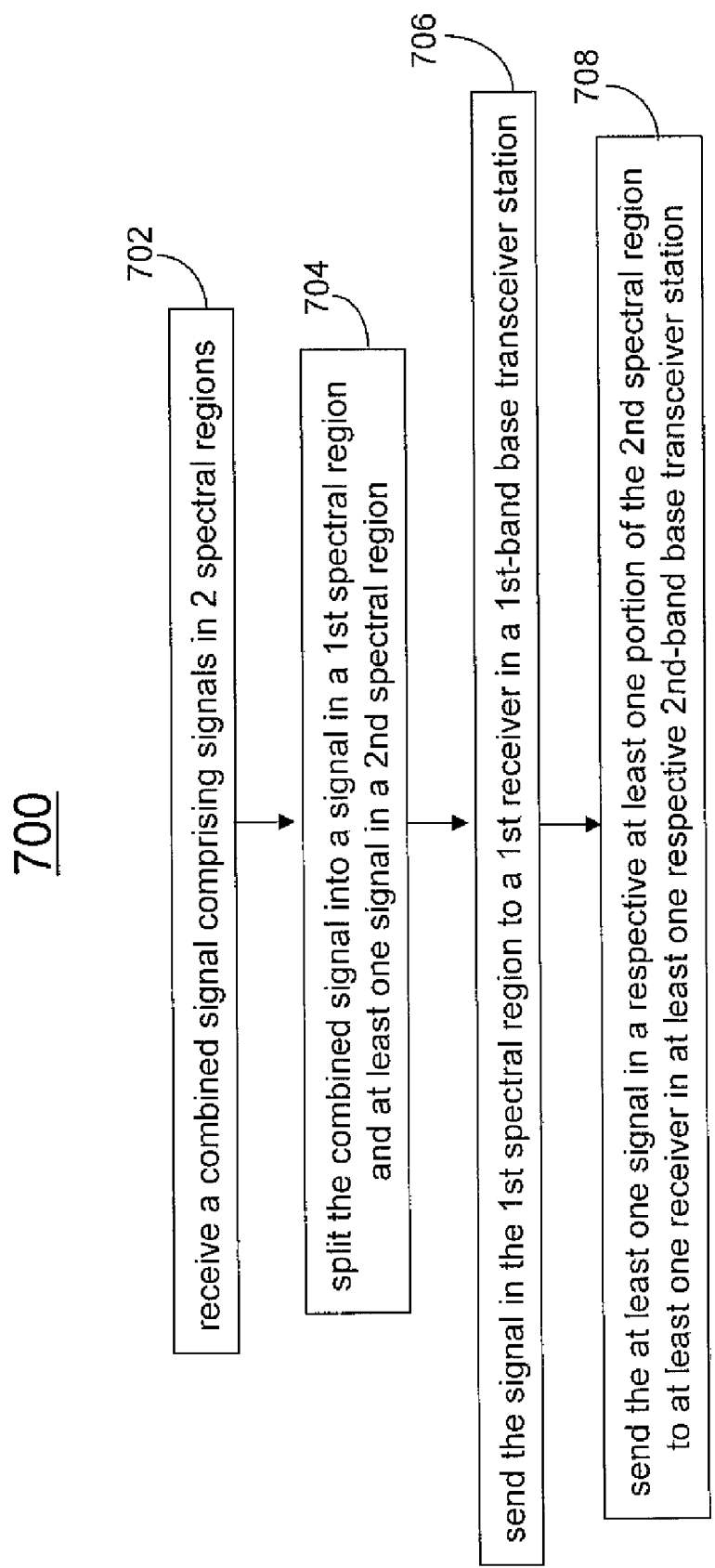
FIG. 7 is a flow diagram of one embodiment of a method of receiving signals in a plurality of radio frequency spectral regions in a multiplexing apparatus from a cable.

FIG. 7 is a flow diagram of one embodiment of a method 700 of receiving signals in a plurality of radio frequency spectral regions, such as 310, 312A, and 312C, in a multiplexing apparatus 20 from a cable 155. Method 700 is described with reference to FIGS. 1 and 3-6 although method 700 is applicable to other embodiments of the multiplexing apparatus.

At block 702, the combined signal 200 is received via a radio frequency cable 155 at the multiplexing apparatus 20. In one such implementation, the combined signal 200 includes signals in the first spectral region 310 and portions 312A, and 312C of the second spectral region. In another such implementation, the combined signal 201 includes signals in first spectral region 310 and portion 312A of the second spectral region and is received via a radio frequency cable 155 at the diplexing apparatus 200. In yet another implementation, the combined signal 201 includes signals in first spectral region 310 and portion 312C of the second spectral region and is received via a radio frequency cable 155 at the diplexing apparatus 200.

At block 704, the combined signal is split into a signal in a first spectral region and at least one signal in a second spectral region in the multiplexing apparatus. In one implementation of this embodiment, each signal in the second spectral region 312 is in 312A or 312C of the second spectral region 312. In another implementation of this embodiment, the combined signal 200 is split into a signal in a first spectral region 310 and at least two signals in a second spectral region at the multiplexing apparatus 20. In yet another implementation of this embodiment, the combined signal 201 is split into one signal in a first spectral region 310 and one signal in a second spectral region 312 in the diplexing apparatus 200.

At block 706, the signal in a first spectral region is sent from the multiplexing apparatus to a first receiver in a first-band base transceiver station via a receiver filter in the multiplexing apparatus and a low-noise amplifier. In one implementation of this embodiment, the signal in the first spectral region 310 is sent to a first receiver 34-1 in a first-band base transceiver station 30-1 via receiver filter 124 in the multiplexing apparatus 20 and the low noise amplifier 120.

At block 708, the at least one signal in a respective at least one portion of the second spectral region is sent from the multiplexing apparatus to at least one receiver in at least one respective second-band base transceiver station via a respective band pass filter in the multiplexing apparatus. In one implementation of this embodiment, the signal in each portion 312A, and 312C of the second spectral region 312 is sent to an associated receiver 34-$i$ in an associated second-band base transceiver station 30-$i$ via an associated band pass filter 112-$i$. In another implementation of this embodiment, the signal in one of the portion 312A of the second spectral region 312 is sent to a receiver 34-2 in the second-band base transceiver station 30-2 via the band pass filter 112-2.

Figure 8:
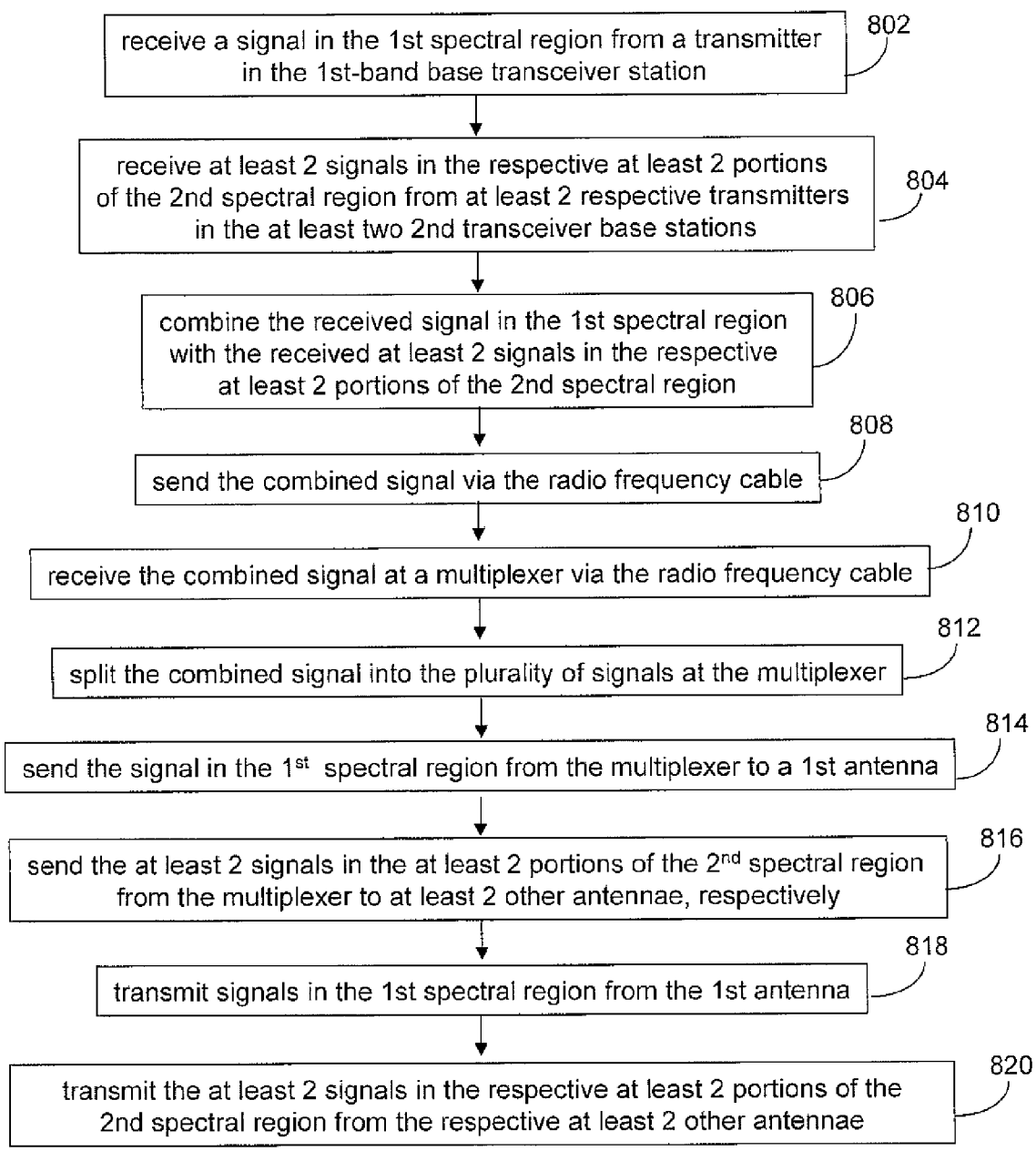
FIG. 8 is a flow diagram of one embodiment of a method of receiving signals in a plurality of radio frequency spectral regions in a multiplexing apparatus and transmitting the signals from the multiplexing apparatus to antennae for transmission.

FIG. 8 is a flow diagram of one embodiment of a method 800 of receiving signals in a plurality of radio frequency spectral regions, such as 310 and 312 in a multiplexing apparatus 20 and transmitting the signals from the multiplexing apparatus 20 to antennae 160(1-N) for transmission. Method 800 is described with reference to FIGS. 1 and 3-4 although method 800 is applicable to other embodiments of the multiplexing apparatus. Methods 700 and 800 together describe a method of transceiving signals in a plurality of radio frequency spectral regions 310 and 312 in a multiplexing apparatus 200.

At block 802, a radio frequency signal 220-1 in the first spectral region 310 is received from a transmitter 32-1 in the first-band base transceiver station 30-1 at the multiplexing apparatus 20. At block 804, at least two signals 220(2-N) in the respective at least two portions 312A and 312B of the second spectral region 312 are received from the at least two respective transmitters 32(2-N) in the at least two second transceiver base stations 30(2-N) at the multiplexing apparatus 20. At block 806, the received signal 220-1 in the first spectral region 310 is combined with the received at least two signals 220(2-N) in the respective at least two portions 312A and 312B of the second spectral region 312 at the multiplexing apparatus 20.

At block 808, the combined signal 230 is sent from the multiplexing apparatus 20 via the radio frequency cable 155. At block 810, a multiplexer 70 receives the combined signal 230 from the multiplexing apparatus 20 via the radio frequency cable 155. At block 812, the multiplexer 70 splits the combined signal 230 into the plurality of signals 240(1-N).

At block 814, the signal 240-1 in the first spectral region 310 is sent from the multiplexer 70 to a first antenna 160-1. At block 816, the at least two signals 240(2-N) in the at least two portions 312A and 312B of the second spectral region 312 are sent from the multiplexer 70 to at least two other antennae 160(2-N).

At block 818, the signal in the first spectral region 310 is transmitted from the first antenna 160-1 responsive to receiving the signal 240-1 in the first spectral region 310 from the multiplexer 70. At block 820, the at least two signals are transmitted in the respective at least two portions 312A and 312B of the second spectral region 312 from the respective at least two other antennae 160(2-N) responsive to receiving the signals 240(2-N) in the portions 312A and 312B of the second spectral region 312 from the multiplexer 70.

FIG. 9 is a flow diagram of one embodiment of a method 900 of receiving signals in two radio frequency spectral regions, such as 310 and 312 in a diplexing apparatus 200 and transmitting the signals from the diplexing apparatus 200 to antennae 160(1-N) for transmission. Method 900 differs from method 800 in that signals in only one portion of the second spectral region are transceived. In this implementation, the multiplexing apparatus is a diplexing apparatus. Method 900 is described with reference to FIGS. 3 and 5-6 although method 900 is applicable to other embodiments of the diplexing apparatus. Methods 700 and 900 together describe a method of transceiving signals in a plurality of radio frequency spectral regions 310 and 312 in a diplexing apparatus 2000.

At block 902, a radio frequency signal 220-1 in the first spectral region 310 is received from a transmitter 32-1 in the first-band base transceiver station 30-1 at the diplexing apparatus 200. At block 904, signal 220-2 in the second spectral region 312 is received from the transmitter 32-2 in the second transceiver base station 30-2 at the diplexing apparatus 200. The signals 220-2 are all within one portion of the spectral region 312. At block 906, the received signal 220-1 in the first spectral region 310 is combined with the received signal 220-2 in the second spectral region 312 at the diplexing apparatus 200.

At block 908, the combined signal 230 is sent from the diplexing apparatus 200 via the radio frequency cable 155. At block 910, a diplexer 71 receives the combined signal 230 from the diplexing apparatus 200 via the radio frequency cable 155. At block 912, the diplexer 71 splits the combined signal 230 into two signals 240(1-2).

At block 914, the signal 240-1 in the first spectral region 310 is sent from the diplexer 71 to a first antenna 160-1. At block 916, the signal 240-2 in the second spectral region 312 is sent from the diplexer 71 to the other antenna 160-2.

At block 918, the signal in the first spectral region 310 is transmitted from the first antenna 160-1 responsive to receiving the signal 240-1 in the first spectral region 310 from the diplexer 71. At block 920, the signal in the second spectral region 312 is transmitted from the other antenna 160-2 responsive to receiving the signal 240-2 in the second spectral region 312 from the diplexer 71.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A system for transceiving radio frequency signals, the system comprising:
   a multiplexing apparatus at a base of a tower and communicatively coupled to a cable, the cable being communicatively coupled to at least one antenna at the top of the tower, the multiplexing apparatus including a transmitter path, a portion of a receiver path, and a transceiver path portion, wherein the multiplexing apparatus includes:
   a transmitter filter communicatively coupled between the cable and a first-band base transceiver station,
   a band pass filter portion including at least one band pass filter communicatively coupled between the cable and at least one second-band base transceiver station, and
   a first receiver filter communicatively coupled between the cable and a low noise amplifier;
   a second receiver filter; and
   the low noise amplifier at the base of the tower, the low noise amplifier operable to amplify signals in a first spectral region, the low noise amplifier communicatively coupled to the portion of the receiver path of the multiplexing apparatus, wherein the multiplexing apparatus is configured to pass signals in the first spectral region between the cable and the first-band base transceiver station via the portion of the receiver path of the multiplexing apparatus and the low noise amplifier, and wherein the multiplexing apparatus is further configured to pass signals in a second spectral region between the cable and the at least one second-band base transceiver station via the transceiver path portion, wherein the transmitter filter is configured to pass signals in the first spectral region from the first-band base transceiver station to the cable, wherein the first receiver filter is configured to pass signals in the first spectral region from the cable to the first-band base transceiver station via the low noise amplifier and the second receiver filter, wherein each filter in the band pass filter portion is configured to filter and pass signals in respective portions of the second spectral region between the cable and a respective one of the at least one second-band base transceiver station.

2. The system of claim 1, wherein the transmitter path and the receiver path are between the cable and the first-band base transceiver station, wherein the transmitter path comprises the transmitter filter operably positioned between the cable and the first-band base transceiver station, and wherein the receiver path comprises the first receiver filter, the low noise amplifier, and the second receiver filter.

3. The system of claim 1, wherein the low noise amplifier is communicatively coupled between the first and second receiver filters.

4. The system of claim 1, wherein at least one band pass filter in the band pass filter portion is an inline cavity filter.

5. The system of claim 1, wherein the multiplexing apparatus is a diplexing apparatus, wherein the transceiver path portion comprises a single transceiver path, wherein the transceiver path comprises a band pass filter positioned between the cable and a respective second-band base transceiver station, the transceiver path operable to transmit and receive signals in the second spectral region.

6. The system of claim 5, wherein the at least one antenna includes a first antenna and a second antenna, the system further comprising:
the cable;
a diplexer communicatively coupled to the cable;
the first antenna configured to receive and transmit signals in the first spectral region; and
the second antenna, wherein the second antenna is configured to receive and transmit signals in the second spectral region, wherein the first antenna and the second antenna are communicatively coupled to the cable via the diplexer.

7. The system of claim 1, wherein the transceiver path portion comprises at least two transceiver paths for transmitting and receiving signals in respective at least two portions of the second spectral region, wherein each of the at least two transceiver paths comprises a respective band pass filter in the band pass filter portion positioned between the cable and a respective one of the at least one second-band base transceiver station, each second-band base transceiver station configured to transceive signals in a respective portion of the second spectral region.

8. The system of claim 7, wherein the at least one antenna includes a first antenna and at least two other antennae, the system further comprising:
the cable;
a multiplexer communicatively coupled to the cable;
the first antenna configured to receive and transmit signals in the first spectral region; and
the at least two other antennae, wherein each of the other antennae is configured to receive and transmit signals in a respective portion of the second spectral region, wherein the first antenna and the at least two other antennae are communicatively coupled to the cable via the multiplexer.

9. A method of transceiving signals in a multiplexing apparatus, the method comprising:
receiving a combined signal comprising signals in two spectral regions via a radio frequency cable at the multiplexing apparatus at a base of a tower;
splitting the combined signal into a first-spectral-region signal in a first spectral region and at least two second-spectral-region signals in a second spectral region in the multiplexing apparatus;
sending the first-spectral-region signal from the multiplexing apparatus to a first receiver in a first-band base transceiver station via a receiver filter in the multiplexing apparatus and via a low-noise amplifier positioned at the base of the tower;
sending the at least two second-spectral-region signals in at least two respective portions of the second spectral region from the multiplexing apparatus to respective receivers in at least two second-band base transceiver stations via at least two respective band pass filters in the multiplexing apparatus:
receiving a first-spectral-region signal in the first spectral region from a transmitter in the first-band base transceiver station at the multiplexing apparatus;
receiving at least two second-spectral-region signals in the at least two respective portions of the second spectral region from at least two respective transmitters in the at least two second transceiver base stations at the multiplexing apparatus;
combining the received signal in the first spectral region with the received at least two signals in the respective at least two portions of the second spectral region at the multiplexing apparatus; and
sending the combined signal from the multiplexing apparatus via the radio frequency cable.

10. The method of claim 9, the method further comprising:
receiving the combined signal from the multiplexing apparatus at a multiplexer via the radio frequency cable;
splitting the combined signal into a plurality of signals at the multiplexer;
sending the first-spectral-region signal from the multiplexer to a first antenna;
sending the at least two second-spectral-region signals from the multiplexer to at least two other antennae, respectively;
transmitting first-spectral-region signal from the first antenna responsive to receiving the first-spectral-region signal from the multiplexer; and
transmitting the at least two second-spectral-region signals from the respective at least two other antennae responsive to receiving the signals in the portions of the second spectral region from the multiplexer.

11. The method of claim 9, wherein sending the at least one second-spectral-region signal from the multiplexing apparatus to the respective receiver in the at least one second-band base transceiver station via the respective band pass filter in the multiplexing apparatus comprises:
sending a second-spectral-region signal from the multiplexing apparatus to the receiver in the second-band base transceiver station via the respective band pass filter in the multiplexing apparatus, and wherein the multiplexing apparatus is a diplexing apparatus, the method further comprising
receiving a first-spectral-region signal from a transmitter in the first-band base transceiver station at the diplexing apparatus;
receiving the second-spectral-region signal from the transmitter in the second transceiver base station at the diplexing apparatus;
combining the received first-spectral-region signal and second-spectral-region signal at the diplexing apparatus; and
sending the combined signal from the diplexing apparatus via the radio frequency cable.

12. The method of claim 11, the method further comprising:
receiving the combined signal from the diplexing apparatus at a diplexer via the radio frequency cable;
splitting the combined signal into two signals at the diplexer;
sending the first-spectral-region signal from the diplexer to a first antenna;
sending the second-spectral-region signal from the diplexer to a second antenna;
transmitting first-spectral-region signal from the first antenna responsive to receiving the signal in the first spectral region from the diplexer; and
transmitting the second-spectral-region signal from the second antenna responsive to receiving the second-spectral-region signal from the diplexer.

13. A system for transceiving radio frequency signals, the system comprising:
a first antenna at a top of a tower, the first antenna configured to receive and transmit signals in a first spectral region;
at least one other antenna at the top of the tower, the at least one other antenna configured to receive and transmit signals in a second spectral region;
a cable communicatively coupled to the first antenna and the at least one other antenna;
a multiplexing apparatus at a base of the tower and communicatively coupled to the first antenna and the at least one other antenna via the cable, the multiplexing apparatus including a transmitter path, a portion of a receiver path, and a transceiver path portion, wherein the multiplexing apparatus includes:
a transmitter filter communicatively coupled between the cable and a first-band base transceiver station,
a band pass filter portion including at least one band pass filter communicatively coupled between the cable and at least one second-band base transceiver station, and
a first receiver filter communicatively coupled between the cable and the low noise amplifier; and
a second receiver filter; and
a low noise amplifier at the base of the tower, the low noise amplifier operable to amplify signals in the first spectral region, the low noise amplifier communicatively coupled to the multiplexing apparatus, wherein the multiplexing apparatus is configured to pass signals in the first spectral region between the cable and the first-band base transceiver station via the portion of the receiver path of the multiplexing apparatus and the low noise amplifier, and wherein the multiplexing apparatus is further configured to pass signals in the second spectral region between the cable and the at least one second-band base transceiver station via the transceiver path portion,
wherein the transmitter filter is configured to pass signals in the first spectral region from the first-band base transceiver station to the cable,
wherein the first receiver filter is configured to pass signals in the first spectral region from the cable to the first-band base transceiver station via the low noise amplifier and the second receiver filter, and
wherein each filter in the band pass filter portion is configured to filter and pass signals in respective portions of the second spectral region between the cable and a respective one of the at least one second-band base transceiver station.

14. The system of claim 13, wherein the transmitter path and the receiver path are between the cable and the first-band base transceiver station,
wherein the transmitter path comprises the transmitter filter operably positioned between the cable and the first-band base transceiver station, and
wherein the receiver path comprises the first receiver filter, the low noise amplifier, and the second receiver filter.

15. The system of claim 13, wherein the low noise amplifier is communicatively coupled between the first and second receiver filters.

16. The system of claim 13, wherein at least one band pass filter in the band pass filter portion is an inline cavity filter.

17. The system of claim 13, wherein the multiplexing apparatus is a diplexing apparatus, wherein the transceiver path portion comprises a single transceiver path, wherein the transceiver path comprises a band pass filter positioned between the cable and a respective second-band base transceiver station, the transceiver path operable to transmit and receive signals in the second spectral region.

18. The system of claim 17, wherein the at least one other antenna is a second antenna, the system further comprising:
a diplexer to communicatively couple the cable to the first antenna and the second antenna.

19. The system of claim 13, wherein the transceiver path portion comprises at least two transceiver paths for transmitting and receiving signals in respective at least two portions of the second spectral region, wherein each of the at least two transceiver paths comprises a respective band pass filter in the band pass filter portion positioned between the cable and a respective one of the at least one second-band base transceiver station, each second-band base transceiver station configured to transceive signals in a respective portion of the second spectral region.

20. The system of claim 19, wherein the at least one other antenna is at least two other antennae, wherein each of the other antennae is configured to receive and transmit signals in a respective portion of the second spectral region, the system further comprising:
a multiplexer to communicatively couple the cable to the first antenna and the at least two other antennae.

* * * * *